(12) United States Patent
Isberg et al.

(10) Patent No.: US 11,140,541 B2
(45) Date of Patent: Oct. 5, 2021

(54) METHOD FOR MANAGEMENT OF MOVABLE EDGE COMPUTING SERVERS

(71) Applicant: SONY MOBILE COMMUNICATIONS INC., Tokyo (JP)

(72) Inventors: Anders Isberg, Akarp (SE); Linh Trang, Akarp (SE); Basuki Priyanto, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/618,616

(22) PCT Filed: Jun. 5, 2018

(86) PCT No.: PCT/EP2018/064699
§ 371 (c)(1),
(2) Date: Dec. 2, 2019

(87) PCT Pub. No.: WO2018/224470
PCT Pub. Date: Dec. 13, 2018

(65) Prior Publication Data
US 2020/0186989 A1    Jun. 11, 2020

(30) Foreign Application Priority Data
Jun. 5, 2017    (EP) ..................................... 17174429

(51) Int. Cl.
*H04W 8/12*    (2009.01)
*H04W 8/08*    (2009.01)
(Continued)

(52) U.S. Cl.
CPC ............... *H04W 8/08* (2013.01); *H04L 67/10* (2013.01); *H04L 67/12* (2013.01); *H04L 67/327* (2013.01);
(Continued)

(58) Field of Classification Search
CPC . H04W 36/12; H04W 36/0016; H04W 36/36; H04W 88/16
See application file for complete search history.

(56) References Cited

U.S. PATENT DOCUMENTS

| 2013/0337811 A1* | 12/2013 | Faerber | H04W 36/0083 |
| | | | 455/436 |
| 2014/0226559 A1* | 8/2014 | Jactat | H04B 7/15507 |
| | | | 370/315 |

(Continued)

FOREIGN PATENT DOCUMENTS

| CN | 106358245 A | 1/2017 | |
| WO | 20180082709 A1 | 5/2018 | |
| WO | WO2018082709 A1 * | 11/2018 | ............ H04W 28/08 |

OTHER PUBLICATIONS

International Search Report and Written Opinion from corresponding International Patent Application No. PCT/EP2018/064699, dated Aug. 23, 2018, 11 pages.

*Primary Examiner* — Dai Phuong
(74) *Attorney, Agent, or Firm* — Tucker Ellis LLP

(57) ABSTRACT

Methods and apparatus are provided for controlling a session of an application executed by a User Equipment (UE), using an Edge Computing (EC) management entity configured to manage EC servers comprising computer resources. The EC management entity obtains server information including mobility information related to a first movable EC server. A connection between the UE and the first movable EC server is managed based on the received mobility information.

19 Claims, 5 Drawing Sheets

(51) Int. Cl.
  *H04W 4/50* (2018.01)
  *H04L 29/08* (2006.01)
  *H04W 36/00* (2009.01)
  *H04W 40/20* (2009.01)
  *H04W 64/00* (2009.01)

(52) U.S. Cl.
  CPC ......... *H04W 4/50* (2018.02); *H04W 36/0033* (2013.01); *H04W 40/20* (2013.01); *H04W 64/006* (2013.01)

(56) References Cited

U.S. PATENT DOCUMENTS

| | | | |
|---|---|---|---|
| 2015/0024757 A1* | 1/2015 | Bulakci | H04W 36/0088 455/437 |
| 2016/0081055 A1* | 3/2016 | Chika | H04W 36/32 370/315 |
| 2016/0157204 A1* | 6/2016 | Fukuta | H04W 64/003 455/456.2 |
| 2017/0105160 A1* | 4/2017 | Li | H04W 36/0058 |
| 2019/0045409 A1* | 2/2019 | Rasanen | H04W 36/0016 |
| 2019/0268812 A1* | 8/2019 | Li | H04W 36/0077 |
| 2019/0281582 A1* | 9/2019 | Chen | H04W 72/005 |
| 2020/0191901 A1* | 6/2020 | Lindoff | H04W 4/027 |
| 2020/0322036 A1* | 10/2020 | Dussmann | H04W 72/0406 |

* cited by examiner

METHOD FOR MANAGEMENT OF MOVABLE EDGE COMPUTING SERVERS

TECHNICAL FIELD

The invention and its embodiments are related to the field of systems for providing edge computing power in connection with communication networks, whereby computing power is made available to user equipment operating in communication with the communication network. More specifically, the invention relates to devices and methods for management of movable edge computing servers.

BACKGROUND

The development of cloud-based services, operating to assist mobile devices with network-assisted storage and computing, is heavily increasing. Currently, ETSI (European Telecommunication Standards Institute) is promoting a new technology originally denoted Mobile Edge Computing (MEC), which is being standardized in an ETSI Industry Specification Group (ISG) of the same name. In the second phase of ETSI MEC ISG this is replaced by the term Multi-access Edge Computing, using the same acronym MEC, which also includes other types of access besides cellular, e.g. wifi and fixed networks.

MEC is a network architecture concept that enables cloud computing capabilities and an IT service environment at the edge of a communication network. MEC is the term used by ETSI for the concept mobile Edge Computing (EC). MEC allows applications to benefit from ultra-low latency and high bandwidth as well as real-time access to radio network information.

SUMMARY

The scope of the ETSI MEC phase 1 did not consider cases where there may be a need for new computing resources, such as a temporary need, or where such new computing resources become temporarily available within the coverage area of a MEC system. By only limiting computing resource that rely on existing MEC system means limitation in computing power, capacity, latency and flexibility and there is no load distribution in case of new computing resources are available. The new computing resources can be a mobile MEC server. Here, one improvement is to allow moveable/mobile MEC servers to easily connect to an existing "fixed" MEC system, hence improve its capacity, flexibility and coverage area. Note, movable EC server has not been defined elsewhere and we propose the operation of the movable EC server in MEC phase 2 standardization.

MEC is the term used by ETSI, but other forms of Edge Computing architectures are plausible, such as proprietary systems. For these reasons, the more general term Edge Computing (EC) will predominantly be employed herein, while the term MEC will occasionally to illustrate such examples.

Solutions related to the problems associated with a mobile and temporarily available EC server are set out in the claims.

In accordance with a first aspect, an Edge Computing (EC) management entity is provided for managing a plurality of EC servers configured to provide compute resources to a User Equipment (UE) for an application service, the plurality of EC servers including a first EC server, which is movable, connected to a first communication node, and a second EC server connected to a second communication node;

wherein the EC management entity has a communication interface for obtaining server information including mobility information related to the first EC server, and wherein the EC management entity is configured to manage a connection of the UE to one of said EC servers based on said server information. The first EC server may be movable, i.e. physically mobile, with respect to at least one of said EC management entity and said second EC server, such as located on a vehicle or other propelled or mobile carrier. By making use of at least the mobility information of the server information, the EC management entity may conveniently distribute compute resources for UEs to selected EC servers, e.g. dependent on temporary location and possibly speed of an EC server with respect to one of another EC server, the EC management entity, or a UE to be supported. Furthermore, control signaling between EC servers and the EC management entity may be combined by e.g. relaying, so as to streamline use of a wireless spectrum and broadband resources.

In one embodiment, the EC management entity is configured to detect compute resource information from said server information.

In one embodiment, the EC management entity is configured to obtain a metric of link quality to the first EC server from said server information.

In one embodiment, the EC management entity is configured to obtain a metric of load of the first EC server from said server information.

In one embodiment, the EC management entity is configured to define a set of EC servers, and to selectively include the first EC server in said set dependent on information received over said communication interface.

In one embodiment, the EC management entity is configured to selectively associate the first EC server to the second EC server dependent on said server information, and to control one of said first and second EC server to act as a control signal relay for the other of said first and second EC server, dependent on said association.

In one embodiment, said mobility information includes a mobility status reflecting a mobility speed level for the first EC server.

In one embodiment, said mobility information includes positioning information associated with the first EC server.

In one embodiment, the EC management entity is configured to transmit a control signal to a communication network to route the UE to an identified network node.

In one embodiment, the identified network node is said first network node.

In one embodiment, the EC management entity comprises an Operation Support System and a Mobile edge orchestrator of a Multi-access Edge Computing (MEC) network architecture.

In one embodiment, the EC management comprises a Mobile edge platform manager.

In one embodiment, the EC servers are configured to act as MEC hosts.

In accordance with a second aspect, an Edge Computing (EC) server is provided, configured to provide compute resources to a User Equipment (UE) for an application service under control of an EC management entity for managing a plurality of EC servers, wherein the EC server is mobile and has a communication interface for providing server information including mobility information to the EC management entity.

In one embodiment, the EC server is configured to repetitively provide mobility information to the EC management entity, e.g. aperiodically by triggereing or periodically.

In one embodiment, the EC server is configured to transmit an announcement message over a network, to identify availability as an EC server.

In one embodiment, the EC server is configured to exchange server information with an auxiliary EC server, including said mobility information.

In one embodiment, the EC server is configured to transmit server information to the EC management entity according to any of the preceding embodiments.

In one embodiment, the EC server is configured to act as a Mobile edge host, and the EC management entity comprises an Operation Support System and a Mobile edge orchestrator of a Multi-access Edge Computing network architecture.

In accordance with a third aspect, a system for Edge Computing (EC) is provided, comprising a plurality of EC servers configured to provide compute resources to a User Equipment (UE) for an application service, the system comprising a first EC server, which is mobile, connected to a first communication node;

a second EC server connected to a second communication node;

an EC management entity connectable to said first and second EC servers, wherein the EC management entity has a communication interface for obtaining mobility information related to the first EC server, and wherein the EC management entity is configured to manage a connection of the UE to one of said EC servers based on information obtained over said communication interface.

In one embodiment, the system is configured in accordance with any of the preceding claims.

In accordance with a fourth aspect, a method is provided for controlling a session of an application executed by a User Equipment (UE), using an Edge Computing (EC) management entity configured to manage EC servers comprising compute resources, said EC management entity obtaining server information including mobility information related to a first movable EC server;

managing a connection between the UE and the first movable EC server based on the received mobility information.

In one embodiment, the method comprises said EC management entity assigning an EC server to host said application based on said mobility information.

In one embodiment, the method comprises said EC management entity transmitting a control signal to a communication network to route the UE to an identified network node.

BRIEF DESCRIPTION OF THE DRAWINGS

Various embodiments will be outlined below with reference to the drawings, on which

DESCRIPTION OF EMBODIMENTS

Figure 1:
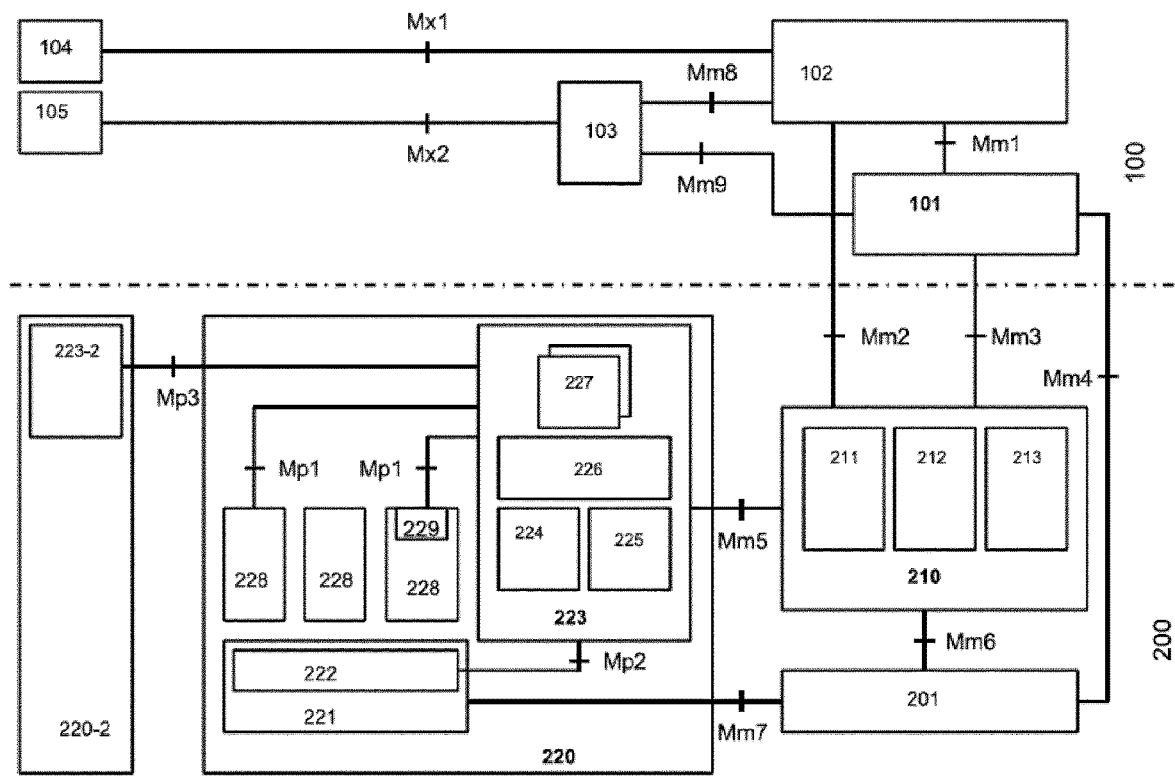
FIG. 1 illustrates an EC system according to one embodiment.

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Edge Computing (EC) is thought of as a natural development in the evolution of mobile radio stations and the convergence of IT and telecommunication networking. EC is based on a virtualized platform and will enable applications and services to be hosted 'on top' of mobile network elements, i.e. above the network layer. These applications and services can benefit from being in close proximity to the customer and from receiving local radio-network contextual information. The environment of EC is characterized by low latency, proximity, high bandwidth, and real-time insight into radio network information and location awareness, accomplished with EC servers hosting operator or 3rd party applications. As such, EC may enable new vertical business segments and services for consumers and enterprise customers. Frequently discussed use cases include video analytics, location services, Internet-of-Things (IoT), augmented reality, optimized local content distribution, data caching, mobile gaming, connected and controlled vehicle services etc. EC will allow software applications to tap into local content and real-time information about local-access network conditions. By deploying various services and caching content at the network edge, mobile core networks are alleviated of further congestion and can efficiently serve local purposes.

FIG. 1 illustrates an EC system reference architecture, in the form of a MEC network architecture configured according to an embodiment, showing functional elements that comprise the EC system, and the reference points between them. For an ETSI MEC system with Mobile Edge (ME) components, there are three groups of reference points defined between the system entities:

reference points regarding ME platform functionality (Mp);

management reference points (Mm); and reference points connecting to external entities (Mx).

In accordance with some embodiments, an ME system may be divided into an ME system level 100 and an ME host level 200. The system may comprise one or more ME servers 220, 220-2 etc., and ME management necessary to run ME applications within an operator network or a subset of an operator network.

The ME server 220 may be an entity that contains an ME platform and a virtualization infrastructure 221 which provides compute, storage, and network resources, for the purpose of running ME applications 228.

The ME server 220, 220-2, or more generally an EC server 220, may comprise an ME platform 223, which is a collection of essential functionality required to run ME applications 228 on a particular virtualization infrastructure and enable them to provide and consume ME services. The ME platform 223 may also provide services. Mobile edge applications 228 are instantiated on the virtualization infrastructure of the ME server 220 based on configuration or requests validated by ME management. The ME management may comprise ME system level management and ME host level management. Further ME servers 220-2 may form additional EC servers of the system, which may be configured in a corresponding manner as the ME server 220.

The ME system level management includes an ME orchestrator 101 as a core component, which is configured to have an overview of the complete ME system, and an operations support system 102. The ME host level management comprises an ME platform manager 210 and a virtualization infrastructure manager 201 and is configured to handle management of ME specific functionality of a particular ME server 220, and the applications 228 running on it.

Figure 2:
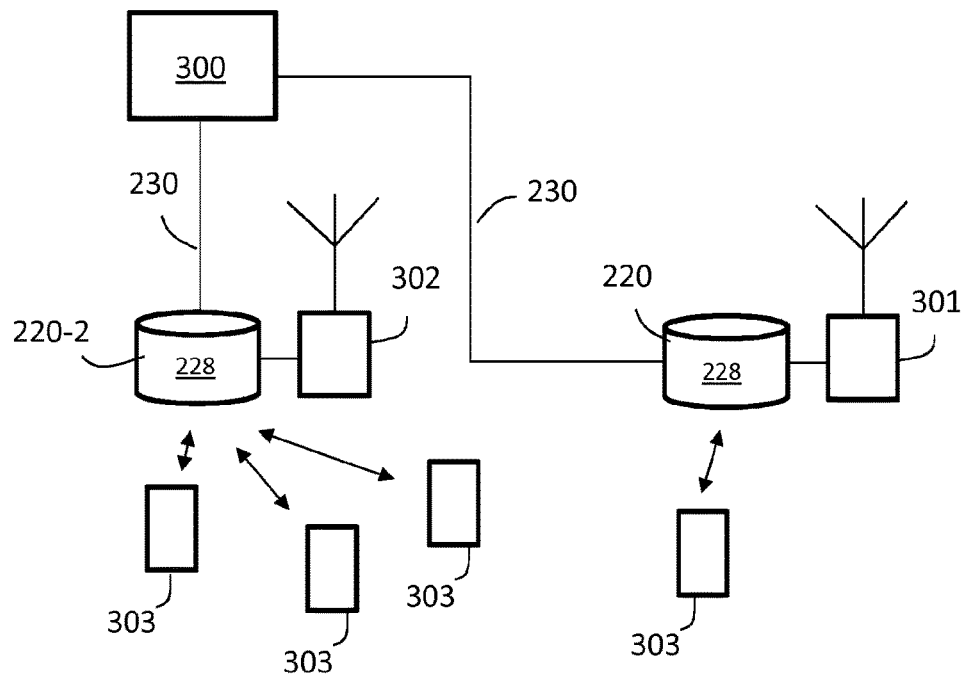
FIG. 2 illustrates a scenario of mobile devices supported by an EC system according to an embodiment.

In an embodiment configured in accordance with the ETSI MEC standard, the system may comprise the following elements or features:

100 Mobile edge system level
101 Mobile edge orchestrator
102 Operations Support System
103 User app LCM proxy
104 CFS portal
105 UE app
200 Mobile edge host level
201 Virtualisation infrastructure manager
210 Mobile edge platform manager
211 ME platform element mgmt
212 ME app rules & reqts mgmt
213 ME app lifecycle mgmt
220 Mobile edge server
221 Virtualisation infrastructure
222 Data plane
223 Mobile edge platform
224 Traffic rules control
225 DNS handling
226 Service registry
227 ME service
228 ME app
229 Service
220-2 Other ME server
223-2 Other ME platform FIG. 2 schematically illustrates various User Equipment (UE) 303 operating as wireless devices 303 in a wireless communication network comprising network nodes 301, 302. The wireless communication network may comprise a radio access network, and the network nodes 301, 302 may be radio stations in a cellular arrangement. Such a radio communication network may e.g. be a 3GPP LTE network, in which the network nodes 301, 302 are denoted eNodeB. Furthermore, in a 3GPP NR network, the network node 301, 302 are denoted gNodeB. In an alternative embodiment, the radio communication network may e.g. be a wifi system, such as according to IEEE 802.11. The network nodes 301, 302 may in such a system be denoted access points and are typically not arranged in a cellular arrangement. In various embodiments, various EC servers may be configured to be connectable to uUEs using other communication technologies, such as e.g. Bluetooth, LoRa, ZigBee etc.

A first server 220 configured to operate as an EC server is connected to a first radio station 301, and a second server 220-2 configured to operate as an EC server is connected to a second radio station 302. An EC management entity 300 may be configured to control relocation of an application session from the first EC server 220 to the second EC server 220-2. With reference to FIG. 1, the EC management entity 300 may e.g. comprise an ME orchestrator 101 and an operations support system 102, and optionally also an ME platform manager 210 in various embodiments. An interface 230 is schematically indicated between an EC application 228 and the EC management entity 300. This interface may be employed for providing context, obtained in the EC server 220, to the management entity 300, which is inter alia configured to control relocation of an application session from the first EC server 220 to a second EC server 220-2.

Figure 3:
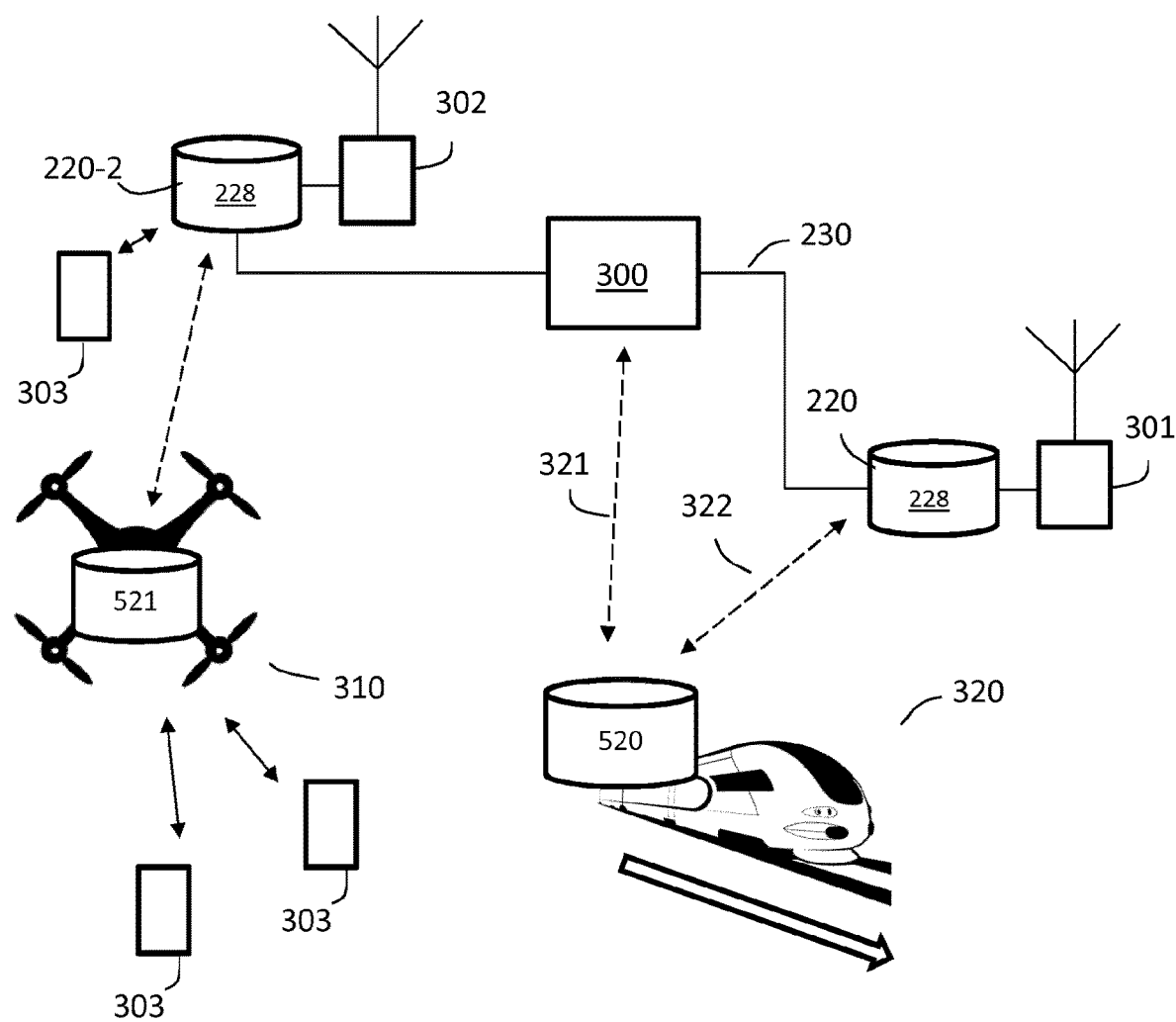
FIG. 3 schematically illustrates the implementation of movable EC servers in an EC system.

FIG. 3 illustrates various embodiments, wherein movable EC servers 520 and 521 are temporarily added and managed by an existing fixed/stationary EC system, such as the one illustrated in FIG. 2. An EC server 521 is operated on top of a drone 310, and it may be moved for example to a location where the users temporarily may be densely populated, e.g. a stadium, concert, traffic jam etc. One EC server 520 is operated in a train 320 and is configured to handle users travelling on the train. As indicated, the EC server 520 on the train 320 may have an interface for direct communication 321 with the EC management entity 300, e.g. by wireless communication, for control signaling between the movable EC server 520 and the EC management entity 300 of the EC system. Such a direct connection to the EC management entity may likewise be arranged for the movable EC server

521. The management entity 300 is centralized while the EC servers (resources) are distributed.

As also illustrated, if the train and its EC server 520 moves further way and the link quality 321 to the management entity 300 is poor, the movable EC server 520 may be associated with a fixed EC server 220 to relay the control signaling 322 to the management entity 300. In such an embodiment, the EC management entity 300 may be configured to obtain a metric of link quality, associated with the connection 321, to the EC server 520 from obtained server information related to the movable EC server 520. The EC management entity 300 may further be configured to define a set of EC servers, and to selectively include the EC server 520, or EC server 521, in said set dependent on information received over said communication interface. Such a set may include an identified further EC server 220-2. The EC management entity 300 may thereby be configured to selectively associate the EC server 520 to the EC server 220, and to control one of said servers to act as a control signal relay for the other of said servers, dependent on said association.

In the drawing of FIG. 3, the EC server 220 may be configured to act as a relay for mobile server 520. However, in an alternative embodiment, the link quality 321 between the movable EC server 520 may be deemed to be more suitable to use than the link 230 between the EC server 220 and the EC management entity 300, and in such a scenario the EC management entity may instead be configured to control the movable EC server 520 to act as a relay for the EC server 220. Such a decision of association and relay may be taken based on a total cost determination, including one or more of link quality, bandwidth, transmission cost, and load, of the respective EC server 220, 520.

This disclosure thus proposes to introduce mobile Edge Computing, EC, servers in the EC architecture. The movable EC servers are mobile in the sense that they can move (physically) within one or more communication networks and thereby provide extra capacity when and where needed to an EC system. The EC system thus comprises at least one movable EC server and an EC management entity. The EC management entity is configured to keep track of the movable EC servers and to distribute UEs among the movable EC servers and possibly also stationary EC servers. The EC management entity 300 needs to be updated to also be able to handle the proposed movable EC servers. To be able to manage the movable EC servers, the EC management entity needs to take server information, related to at least the mobility of the EC server, into account to e.g. suitably distribute compute resouces and to manage control signaling to such EC servers.

Figure 4:
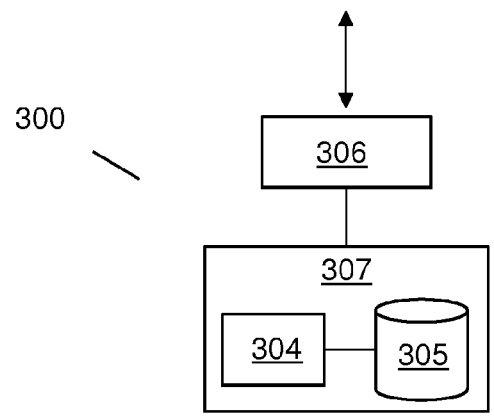
FIG. 4 schematically illustrates a device or system, configured to operate as an EC management entity for controlling and orchestrating distribution of UEs to various EC servers, according to an embodiment.

FIG. 4 schematically illustrates a system configured to operate as an EC management entity 300, so as to carry out the method as described in various embodiments herein. The EC management entity 300 may be distributed, and it may be a cloud implementation. The EC management entity 300 may comprise processing means, memory storage, and computer program code for execution by the processing means to perform the methods proposed herein. As in the illustrated embodiment, the EC management entity 300 may include a control unit 307, which control unit 307 may include a processing device 304 and a data memory 305 holding computer program code. The processing device 304 may include one or more microprocessors, and the data memory 305 may e.g. include a non-volatile memory storage. The processing device 304 is preferably configured to execute the computer program code such that the control unit 307 is configured to control the device to operate as provided in the embodiments of the method suggested herein, e.g. to operate as an EC management entity, realizing the functions of a MEC operations support system and a MEC mobile edge orchestrator in an EC system specified by ETSI, to provide orchestration of infrastructure resource required by an application, instantiation of application, and configuration of application rules based on the application description. The EC management entity 300 further comprises a communication interface 306 (e.g. Mm5, Mm7) for communicating with one or more EC servers, including movable EC servers.

The EC management entity 300 is typically configured to distribute UEs 303 between different EC servers 220. For example, the EC management entity 300 is configured to decide which server to host an application requested by the UE and/or to dynamically decide, dependent on each UE's context in the application, if the UE should be relocated to another server due to e.g. mobility of the UE. Distribution is traditionally based on parameters of server information such as load, capacity, geographical location of the UEs and EC servers, application requirements (e.g. latency) etc.

Examples of server information parameters used for distribution of stationary and movable EC servers may include:

Traffic information reported by movable EC servers;

Traffic control of movable EC servers to be able to manage, control and reduce network traffic by defining rules to avoid delay-related problems as caused by latency, congestion and packet loss given the available bandwidth;

Load (number of users) on the movable EC server.

As each EC server (stationary or mobile) can only handle a limited number of users, the load on the available EC servers is taken into account when assigning or relocating UEs 303 among EC servers.

The proposed EC management entity 300 is configured to also take into account information related to the mobility of the EC servers. In other words, the EC management entity 300 is configured to distribute UEs between EC servers based on one or more mobility-related parameters of the EC server.

In various embodiments, mobility information, which may include mobility-related parameter values, may be provided by a movable EC server 520 as part of server information in reports sent from the movable EC server 520 to the EC management entity 300. Alternatively, or additionally, the EC management entity 300 may be configured to fetch/receive/retrieve the mobility-related information from an underlying communication network (e.g. a cellular network such as LTE or 5G). In any of these ways, the EC management entity 300 is configured to obtain server information including mobility information related to a movable EC server 520, such as servers 520 or 521. This may e.g. be accomplished using a communication interface such as interface 306 of FIG. 4.

Examples of such mobility-related information are:

Location information reported by movable EC servers.

Location information may comprise geographical coordinates of the movable EC servers. The location information may be obtained by the EC servers, or by a network node or UE to which the EC server is attached, or by a cellular network. The location information may be obtained by a GPS or from the mobile network or by other means. The fact that the EC server may move provides the need for signaling this information continually, e.g. repeated periodically or with a repetition rate that may be dependent on a speed of movement of the server. If there are only stationary EC servers, the location information may only be obtained once by the EC management entity 300.

Mobility status may be reported by movable EC servers, including information describing the movement or mobility of the movable EC server, for example direction, speed. The mobility status may be obtained by the EC server by any available means e.g. GPS measurements or mobility measurements based on cellular network reference signal(s) or sensors.

The EC Management entity 300 may estimate the link quality between a movable EC server and management entity 300 and/or EC server and backhaul, for connections to available EC servers in terms of latency, MCS, bandwidth, data rate, error rate etc. The Link quality typically varies when the movable EC server moves.

In some embodiments the movable EC server assigns a certain capacity, e.g. during a certain time period, to the EC Management entity 300. Capacity might include computing capacity, storage etc. The assigned capacity may be a portion/fraction of the EC server's entire capacity. For example, if the movable EC server is privately owned, the capacity may be assigned when the server is not used by the owner. Alternatively, the EC server may assign a predetermined portion, e.g., 50% of its capacity.

The proposed EC management entity 300 is configured to manage the EC servers (including movable EC servers) based on the mobility-related information. For example, the EC management entity 300 takes mobility-related information into account when assigning an EC server or when relocating a UE to a new EC server. In one embodiment, movement of a UE 303 may be compared with the movement of a movable EC server 520. For example, if a UE 303 is in connection range of a movable EC server 520 and the UE 303 is moving in the same way (direction, speed) as the movable EC server 520, the EC management entity 300 is configured to assign UE 303 to that server 520. This may e.g. be the case for a UE 303 and an EC server 520 on a common vehicle, such as a train, or in separate vehicles travelling along a common route.

In various embodiments, the use of a particular movable EC server 520 for a UE 303 may require that the UE 303 is routed in a communication network, e.g. that it needs to be served by another network node, e.g. eNB, gNB, or Hotspot. Thus, the EC management entity 300 might need to be informed about which network node (e.g. a small eNB, gNB, or WLAN AP) a particular movable EC server 520 is associated with, i.e. used by. This information may be used to determine if a certain UE 303 is compliant with a network node used by a certain EC server 520, e.g. that it uses the same wireless access protocol.

In various embodiments, the EC management entity 300 is configured to instruct a core network of a communication network to route the mobile UE 303 to a particular mobile cell that is associated with (used by) a movable EC server 520, such as a cell 530 onboard the train 320 of FIG. 3.

In various embodiments, a movable EC server 520, 521 resembles a stationary EC server 220, 220-2 in its basic functionality. In addition, the movable EC server is mobile, i.e. its physical location may change. The EC Server is configured to provide temporary computing resources for a certain duration of times and at a certain location.

Figure 5:
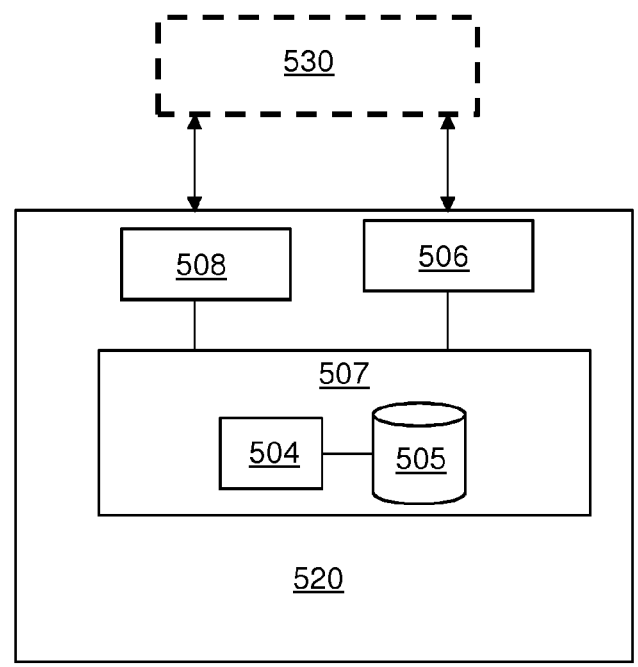
FIG. 5 schematically illustrates a device or system, configured to operate as an EC server which may be mobile, for hosting an application run by a UE according to an embodiment.

FIG. 5 schematically illustrates a mobile EC server 520, which e.g. may be one of the EC servers 520 or 521 of FIG. 3. The EC server 520 comprises processing means, memory storage, and computer program code for execution by the processing means to perform methods proposed herein. As in the illustrated embodiment, the movable EC server 520 may include a control unit 507, which control unit 507 may include a processing device 504 and a data memory 505 holding computer program code. The processing device 504 may include one or more microprocessors, and the data memory 505 may e.g. include a non-volatile memory storage. The processing device 504 is preferably configured to execute the computer program code such that the control unit 507 is configured to control the device to operate as provided in the embodiments of the method suggested herein, e.g. to operate as an EC server, realizing the functions of hosting an application for one or more UEs 303. The movable EC server 520 comprises a communication interface 506 (e.g. Mm5, Mm7) for communicating with an EC management entity 300. Furthermore, the movable EC server 520 may comprise an interface 508 for connection to a network node 530, or include such a network node 530, to provide mobile communication capabilities to the movable EC server. In one embodiment, the movable EC server 520 may employ a common network node 530, or interface 508 to such a network node, for communication with mobile UEs 303 and with the EC management entity 300 and other EC servers 220. In other embodiments, the movable EC server may be configured to employ different network nodes for UE communication and for communication with the EC management entity 300 and EC servers 220. In various embodiments the movable EC server 520 comprises a Mm5 communication interface 506 for communicating with an EC management entity 300.

In various embodiments, the mobility of the server 520 requires that the movable EC Server is arranged to communicate with the EC management entity over a first wireless access technology, e.g. a LTE or 5G network, through an interface 506. This communication may be performed via one or more relaying nodes, such as relaying UEs or base stations.

Furthermore, in various embodiments the movable EC Server 520 is arranged to communicate with one or more UEs 303 via a second wireless access technology. The second communication technology may be a proprietary interface or a standard interface. The second wireless communication technology may be different from the first communication interface. The second wireless interface may be a long-range or a short-range interface, such as LTE, 5G, Wi-Fi, Bluetooth, LoRa, ZigBee etc.

In one exemplary embodiment, the movable EC server is (e.g. physically) connected via its interface 508 to a mobile access point 530, e.g. a mobile short-range AP, or a mobile cellular base station, which provides the communication ability. The mobile access point comprises a mobile communication interface (wireless backhaul) for communicating with a mobile communication network. The mobile access point comprises a mobile communication interface for communicating with UEs.

In various embodiments, a common network node 530 is used both by the interface 506 and interface 508. According to some embodiments, the movable EC server is connected to a UE 530, 303, acting as a wireless modem, which provides its communication capability to both the UEs and the communication network.

According to some embodiments the movable EC server 520 is configured to send information about the types of access technology/technologies, and/or about the characteristic of access technology/technologies (e.g. speed, latency), that are used. The EC system is typically designed to be access-agnostic, but access-specific information can be provided to the EC system as an application service running in the EC server. For example, if the EC server 520 is located at an eNB then RAN related info (RNIS-GS MEC 012 Radio Network Information API) will be available to the EC system. If the EC server is located at a Wi-Fi AP then a corresponding Wi-Fi-RNIS could provide Wi-Fi specific information to the EC system.

The movable EC server 520 is configured to provide server information including mobility-related information, e.g. data or parameters, which defines or make it possible to determine movement of the movable EC server, to the EC management entity 300. Mobility-related information may comprise, but is not limited to: location information (such as position or data usable to determine a position), mobility status (e.g static, low speed, high speed) and capacity. In various embodiments, the movable EC server 520 is configured to announce its availability, e.g. to a communication network in the area. Thereby, the capacity of the movable EC server 520 can be made available to the network and its users. The movable EC server 520 may announce e.g. in a network that it is available and typically also that it may provide additional capacity, such as computing power, storage etc. The announced message may comprise one or several of amount of resources, position of movable EC server, time when resources are available, network information, connection information, movable EC server identity information. The announcing may be performed by a multi or broadcast message, through signaling. This might be relevant for a movable EC server 520 that is not associated with (e.g. owned by) a specific operator.

In various embodiments, solutions are provided herein to introduce and manage movable EC servers 520. The proposed technique may include any of the following features:

A movable EC server 520 is introduced that can provide temporary computing resources for certain duration of times and at a certain location.

The existing EC management entity 300 has a new task to control the operation and the interaction of both stationary EC server 220 and movable EC server 520.

EC management entity 300 can define a set/group of the stationary EC server(s) 220 and the movable EC server(s) 520. For example, the EC management entity 300 can accept or release a new movable EC server 520 in a set, and also manage the association to any fixed EC server 220. The association to a fixed EC server 220 may assist the movable EC server 520 to relay some of the control signaling to the management system in the case where the link quality is becoming poor for the movable EC server 520 and the management system due to the movable EC server's 520 mobility.

The movable EC server 520 in a set is preferably configured with defined characteristics, which may be included in server information, which the movable EC server may provide to the EC management entity 300, such as:

The size of computing resources.

Mobility status (stationary but portable/movable, low, medium, high speed).

Positioning or location information.

In order for the EC management entity 300 to perform the above operation, new parameters are preferably defined for use between the EC server 520 and the EC management entity 300 system, particularly for orchestrating the resources that now are mobile, and for handling application life cycle management for applications hosted on these resources.

This may for example imply that the Mm5 interface in the existing MEC architecture (ref: GS MEC 003 specification), as exemplified in FIG. 1, is updated and specified. The mobile edge host is the terminology for the EC server 520 defined by ETSI MEC according to the GS MEC 001 specification, and is referred to as a MEC host in phase 2.

The management entity 300 could typically be the OSS, the orchestrator and/or the platform manager.

In various embodiment, certain parameters may be exchanged between the movable EC server 520 (computing resource) and the EC management entity, for example over Mm5. In the uplink, i.e. from a movable EC server 520 to the EC management entity 300, such parameters may form part of server information, and may include Load (number of UEs) on the movable EC server 520;

Capacity (CPU/storage) on the movable EC server 520;

Link quality between the movable EC server 520 and the EC management entity 300;

Location information reports from the movable EC server 520;

Mobility status of the movable EC server 520;

Furthermore, the Mm5 interface may be configured to provide traffic control for the movable EC server 520 to be able to manage, control and reduce network traffic by defining rules to avoid latency-related problems, as noted above, congestion and packet loss given the available bandwidth.

As will be apparent from this disclosure, various embodiments relate to a method for controlling a session of an application comprising, in an EC management entity 300:

obtaining EC mobility-related information associated with the movement or mobility of at least one movable EC server 520, and managing a connection between a UE and at least one movable EC server, based on the received EC mobility-related information.

In this context, the EC management entity 300 is informed about the EC server's 520 movement. This information is typically used with other information, such as load, to determine which EC server to use for a particular UE. EC mobility-related information comprises e.g. position, speed, capacity.

In various embodiments, the managing comprises determining or deciding which server to host an application, and possibly onboard the application and instantiate it, requested by a UE 303, or relocating a UE 303 to a new EC server 220, 520. An EC server is thus assigned to host the application for the UE based on the received server information.

In various embodiments, the method may comprise instructing a network node, e.g. core node, to route the UE 303 based on the received EC mobility-related information. The UE might need to move to another access point in order to be able to use a designated EC server. Typically, the UE 303 is moved to a network node of the movable EC server.

In various embodiments, the method may comprise activating one or more additional movable EC servers. In this context, the EC management entity 300 might release new (mobile) capacity by including a new movable EC server in an associated set of servers 220, 520 when needed. For example, another drone 310 is sent up with a movable EC server 521. The activation might be triggered by a request from any party or by a detected demand for more resources.

In one aspect, a method is provided for controlling a session of an application comprising, in a movable EC server 520, sending, to an EC management entity 300, mobility information associated with the movement of the movable EC server.

In this context, the EC server 520 informs the EC management entity 300 about its movements. The sending may e.g. be performed on demand, periodically, repetitively based on level of mobility, or when detected that the EC server 520 has moved. The movable EC server 520 may thereby be configured to inform the network about its location, movement (future and past) etc. The movable EC Server 520 may inform the EC management entity 300 about when and where capacity, e.g. computing power or storage, is available.

Figure 6:
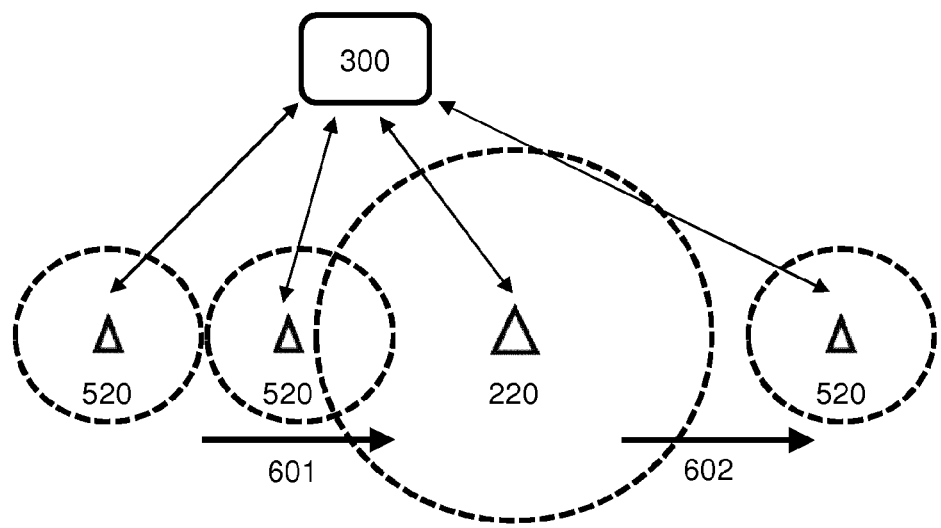
FIG. 6 schematically illustrates a movable EC server moving in and out of a range of connection with another EC server according to an embodiment.
Figure 7:
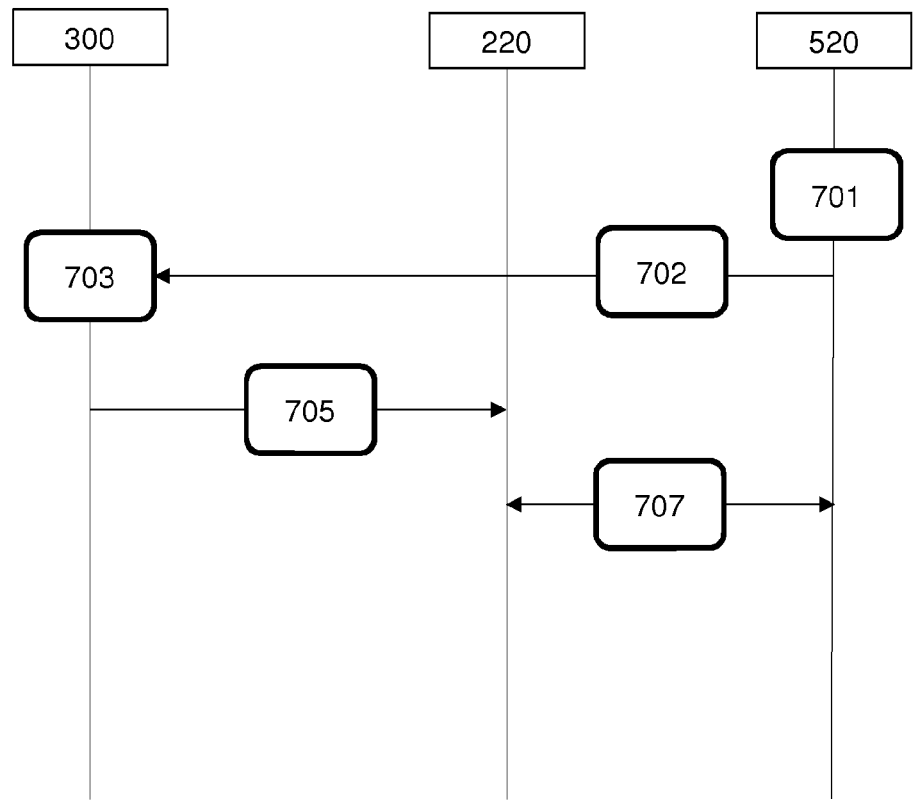
FIG. 7 illustrates signaling in an EC system where a movable EC server moves into connection range of a second EC server according to an embodiment.

FIG. 6 schematically illustrates an EC system comprising an EC management entity 300, a first EC server 520, which is mobile, and a second EC server 220. FIG. 7 illustrates a scheme of communication or signaling, carried out in a system of FIG. 6. With reference to FIG. 3, the movable EC server 520 may e.g. be a server 521 carried in a drone 310, or an EC server 520 carried on a train 320 or other type of vehicle. The EC server 220 may be stationary, but it may also be mobile (i.e. physically movable). FIGS. 6 and 7 serve to illustrate how signalling may be carried out in an embodiment, where two EC servers are mobile with respect to each other. The drawings thus elaborate on how a static (or mobile) EC server 220 and a movable EC server 520 may exchange information and services with one another when they are in proximity.

With reference to FIG. 6, the first EC server 520 and the second EC server 220 are both in at least intermittent connection with the EC management entity 300, as indicated by arrows. The first EC server 520 is mobile with respect to the second EC server 220, and at a certain point the first EC server 520 enters 601 a range of communication with the second EC server 220, illustrated by the larger dashed circle. In this context, a range of communication may be defined by direct communication being possible or having a certain quality. Alternatively, the range of communication may be an area where both the first EC server 520 and the second EC server 220 communicate over a common network node of a communication network 301, such as the same base station or access point. This may be concluded based at least partly on server information, including mobility information related to the first EC server 520, obtained by the EC management entity 300. The mobility information may be obtained from the first EC server 520 or e.g. from a communication network to which the first EC server 520 is connected. The mobility information may include e.g. location data or data related to speed and direction, or data related to a detected network node. The mobility information may alternatively be provided partly by the first EC server 520 upon beginning to move, or when a certain level of mobility is detected, or a certain distance has been covered, whereas location data may be obtained from the network. In various embodiments, the server information may be obtained by periodic or intermittent reports, including one or more of location, mobility status/velocity, link quality etc.

The scenario of the first EC server 520 entering 601 or closing in on the second EC server 220 is illustrated in FIG. 7 by the event indicated as 701. As already noted, the EC management entity 300 may thus be configured to obtain 703 server information 702, which includes mobility information, at least partly from the first EC server 520. In various embodiments, the step of obtaining 703 the server information may involve a step of the first EC server 520 announcing its availability to the EC management entity 300 via a communication network, such as a wireless network usable by the first EC server 520 by means of a network node 530 to communicate with an adjacent server 221 or directly with the EC management entity 300.

Obtaining 703 the server information, or at least the mobility data, may occur periodically or intermittently, but at a certain point the determined distance, or combination of determined distance and velocity and direction, may trigger the EC management entity 300 to inform 705 nearby servers, such as the second server 220, about the first server's 520 availability. Upon notification 705 of the presence of the available first EC server 520 to the second server 220, these servers 520, 220 may be triggered, e.g. by the EG management entity 300, to exchange 707 information such as services available, mobility status (temp stationary, low mobility, high mobility), estimated time in current mobility status, resource sync, load/capacity, user/group context transfers of UEs, etc. UEs connected to one of the first EC server 520 or the second EC server 220 may in this scenario be distributed between the two servers, by moving hosting of applications run by those UEs, if the EC management entity 300 deems it to be appropriate. Again, this may be determined based on the mobility data, but also on available resources as determined based on the server information obtained 703. If it is detected that the first EC server 520 and the second EC server 220 are again moving apart 602 to subsequently lose connection, there may be further exchange of information 707 to determine e.g. distribution of hosting of applications for UEs.

Figure 8:
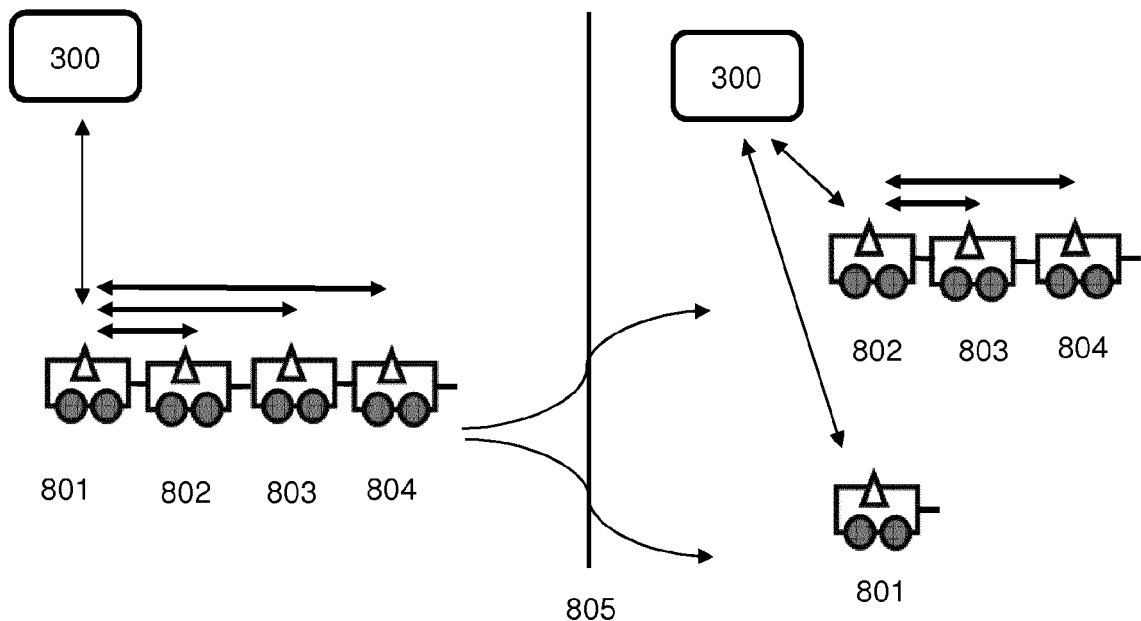
FIG. 8 schematically illustrate an EC system in which plural of movable EC servers are arranged to use one EC server as a relay for communication with an EC management entity.
Figure 9:
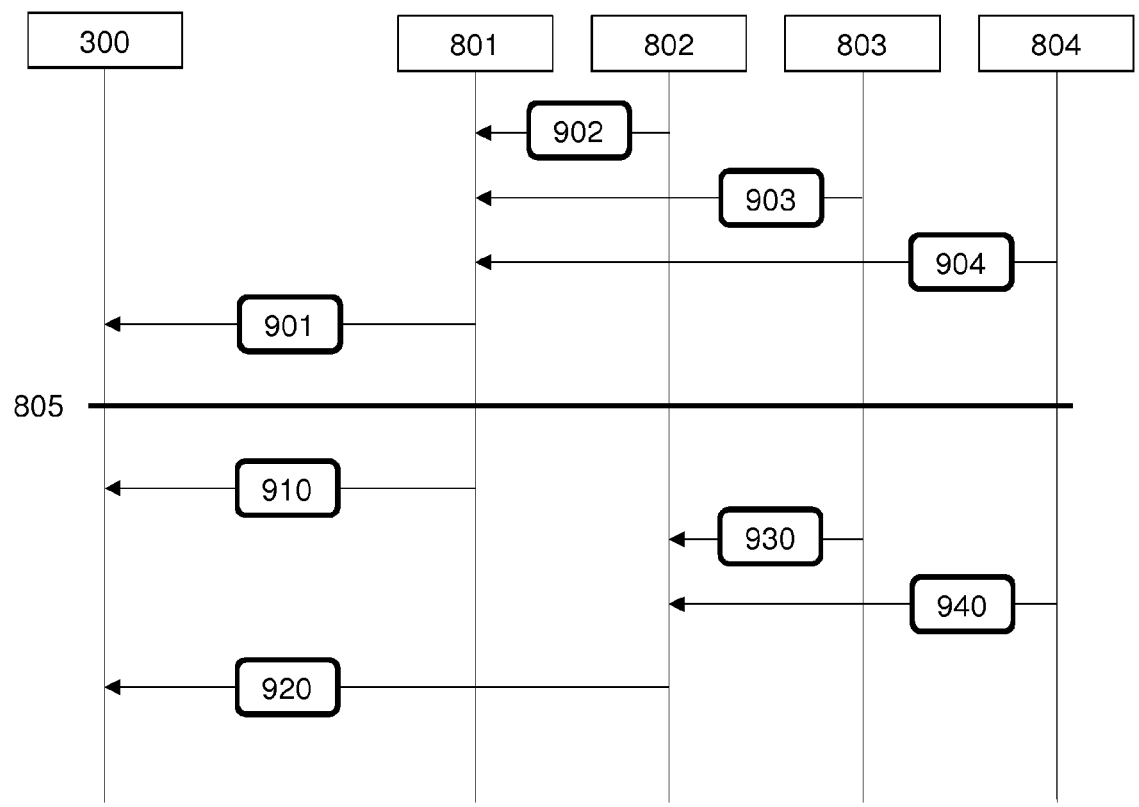
FIG. 9 schematically illustrates signaling in a system of FIG. 8 according to an embodiment.

FIGS. 8 and 9 schematically illustrate an EC system and method in a case where movable EC servers 801-804 are distributed in various train wagons of a train, where a number of wagons each has its own EC server, rather than one EC server serving the whole train. The reason behind this is in various countries and regions, many trains often split up into shorter trains and go into different directions. Correspondingly, two separate train sets may be connected into a longer train at some point for longer distances. In the example of FIG. 8, where several EC servers 801-804 are moving in the same direction and in the same train set, it would make sense to optimize the signaling by letting one server acting relay. This is illustrated in the left part of FIG. 8, and also in the top part of FIG. 9. Each of the EC servers 801-804 may be configured as a movable EC server 520 as outlined with reference to FIG. 5. The EC server 801 of one wagon may be configured to act as the relay, preferably under control of the EC management entity 300. Control signaling between any of the other EC servers 802-804 and the EC management entity 300 is relayed 902, 903, 904 over the first EC server 801, which is configured in communicative connection 901 with the EC management entity 300. This serves to optimize and reduce signaling load to the EC management entity 300, and hence reduce the overall cost of the EC system, at least from a signaling perspective.

At a point in time 805, the train set is split up such that wagon carrying the first EC server 801 takes one path and the wagons with EC servers 802-804 take another path. This is indicated in both FIG. 8 and FIG. 9. Upon obtaining mobility-related information indicating such a split, control signaling to the EC management entity 300 is rearranged. The EC server 801 is thereby controlled, preferably by the EC management entity 300, to no longer act as a relay for the other EC servers 802-804, but to only maintain contact with the EC management entity 300 for the purpose of its own control signaling 910. Since the other EC servers 802-804 are still moving along a common path, another one of these EC servers, the second EC server 802 in the example of the drawings, is instead configured to act as relay for control signaling 930, 940 from the other EC servers 803, 804, and a communication connection 920 to the EC management entity 300 is thus established in the second EC server 802.

It may be noted that an EC system and method according to what has been described for a train, with reference to FIGS. 8 and 9, may just as well be realized for an embodiment of separate vehicles travelling along a common route, such as various cars, buses or trucks driving on a common road, which may fork into different directions.

Various embodiments have been disclosed in the foregoing, related to the proposed concept of management of mobile edge computing servers. Unless clearly contradictory, such embodiments may be combined in any way.

The invention claimed is:

1. An Edge Computing (EC) management entity for managing a plurality of EC servers configured to provide compute resources to a User Equipment (UE) for an application service, the plurality of EC servers including
    a first EC server, which is mobile, connected with a first communication node, and
    a second EC server connected with a second communication node;
    wherein the EC management entity comprises a communication interface obtaining server information comprising mobility information related to movement of the first EC server,
    wherein the EC management entity is configured to manage a connection of the UE to one of said first or second EC servers based on said server information by:
        informing the second EC server of an availability of the first EC server based on the obtained mobility information related to the movement of the first EC server; and
        triggering an exchange of resource information between the first and second EC servers to determine moving hosting of the application service for the UE.

2. The EC management entity of claim 1, configured to detect compute resource information from said server information.

3. The EC management entity of claim 1, configured to obtain a metric of link quality to the first EC server from said server information.

4. The EC management entity of claim 1, configured to obtain a metric of load of the first EC server from said server information.

5. The EC management entity of claim 1, wherein said mobility information includes a mobility status reflecting a mobility speed level for the first EC server.

6. The EC management entity of claim 1, wherein said mobility information includes positioning information associated with the first EC server.

7. The EC management entity of claim 1, configured to transmit a control signal to a communication network to route the UE to an identified network node.

8. The EC management entity of claim 7, wherein the identified network node is said first network node.

9. The EC management entity of claim 1, comprising an Operation Support System and a Mobile edge orchestrator of a Multi-access Edge Computing (MEC) network architecture.

10. The EC management entity of claim 1, comprising a Mobile edge platform manager.

11. The EC management entity of claim 1, wherein the EC servers are configured to act as MEC hosts.

12. A system for Edge Computing (EC) comprising a plurality of EC servers configured to provide compute resources to a User Equipment (EU) for an application service, the system comprising:
    a first EC server, which is movable, connected to with first communication node;
    a second EC server connected with a second communication node; and
    an EC management entity connectable with said first and second EC servers, wherein the EC management entity comprises a communication interface obtaining server information comprising mobility information related to movement of the first EC server,
    wherein the EC management entity is configured to manage a connection of the UE with one of said first or second EC servers based on information obtained over said communication interface by:
        informing the second EC server of an availability of the first EC server based on the obtained mobility information related to the movement of the first EC server; and
        triggering an exchange of resource information between the first and second EC servers to determine moving hosting of the application service for the UE.

13. The system of claim 12, wherein the EC management entity is configured to detect compute resource information from said server information.

14. The system of claim 12, wherein the EC management entity is configured to obtain a metric of link quality to the first EC server from said server information.

15. The system of claim 12, wherein the EC management entity is configured to obtain a metric of load of the first EC server from said server information.

16. The system of claim 12, wherein said mobility information includes a mobility status reflecting a mobility speed level for the first EC server.

17. A method for controlling a session of an application executed by a User Equipment (UE), using an Edge Computing (EC) management entity configured to manage EC servers comprising compute resources, said EC management entity connecting with a first movable EC server, being connected to a first communication node, and a second EC server being connected to a second communication node, the method comprising:
    defining a set of EC servers;
    obtaining server information comprising mobility information related to movement of the first movable EC server;
    managing a connection between the UE and the first movable EC server based on the received mobility information related to the movement of the first EC server by:
        informing the second EC server of an availability of the first EC server based on the obtained mobility information related to the movement of the first EC server; and
        triggering an exchange of resource information between the first and second EC servers to determine moving hosting of the application service for the UE.

18. The method of claim 17, comprising said EC management entity assigning an EC server to host said application based on said mobility information.

19. The method of claim 17, comprising said EC management entity transmitting a control signal to a communication network to route the UE to an identified network node.

* * * * *